United States Patent [19]
Fink et al.

[11] 3,756,663
[45] Sept. 4, 1973

[54] ANTI-SKID SYSTEM

[75] Inventors: Werner Fink, Frankfurt; Erwin Schlitz, Heusenstamm, both of Germany

[73] Assignee: ITT Industries, Inc., New York, N.Y.

[22] Filed: Dec. 8, 1971

[21] Appl. No.: 206,009

[30] Foreign Application Priority Data
Jan. 18, 1971 Germany.................. P 21 02 131.8

[52] U.S. Cl. ............................. 303/21 BE, 303/20
[51] Int. Cl. ........................... B60t 8/08, B60t 8/12
[58] Field of Search...................... 188/181; 303/20, 303/21; 324/160–162; 340/52 R, 262–263

[56] References Cited
UNITED STATES PATENTS

| | | | |
|---|---|---|---|
| 3,672,730 | 6/1972 | Burckhart et al.............. | 303/21 BE |
| 3,260,555 | 7/1966 | Packer.......................... | 303/21 EB |
| 3,606,492 | 9/1971 | Hayes........................... | 303/21 EB |
| 3,653,727 | 4/1972 | Kullberg et al.................. | 303/21 P |
| 3,482,887 | 12/1969 | Sheppard...................... | 303/21 BE |
| 3,556,610 | 1/1971 | Leiber.......................... | 303/21 P |
| 3,620,576 | 11/1971 | Wehde et al.................... | 303/21 BE |
| 3,640,589 | 2/1972 | Taniguchi...................... | 303/21 BE |
| 3,671,083 | 6/1972 | Matsumura.................... | 303/21 BE |

*Primary Examiner*—Milton Buchler
*Assistant Examiner*—Stephen G. Kunin
*Attorney*—C. Cornell Remsen, Jr., Philip M. Bolton and Menotti J. Lombardi, Jr. et al.

[57] ABSTRACT

This relates to an electronic control system for an anti-skid system having one braking pressure control valve actuated by the control system to regulate the braking pressure applied to the wheel brakes of both wheels of one axle of a vehicle. The control system includes a speed sensor associated with each wheel. A reacceleration detector, an incipient skid deceleration detector and a speed decrease detector is coupled to each sensor and a subtractor is coupled to both sensors. A first series circuit including a first AND gate and a first time delay device is coupled to one of the incipient skid deceleration detectors and one of the speed decrease detectors. A second series circuit including a second AND gate and a second time delay device is coupled to the other of the incipient skid deceleration detectors and the other of the speed decrease detectors. First logic circuitry is coupled to each of the time delay devices and the subtractor to produce a first actuation signal for the control valve to release the braking pressure in both wheel brakes when both of the incipient skid deceleration detectors and both of the speed decrease detectors having an output signal or when the subtractor has an output signal, one of the incipient skid deceleration detectors has an output signal and one of the speed decrease detectors has an output signal. Second logic circuitry is coupled to each of the time delay devices and each of the reacceleration detectors to produce a second actuation signal for the control valve to reapply braking pressure to both wheel brakes when both of the reacceleration detectors have an output signal and both of the time delay devices have an output signal, or when one of the time delay devices has had no output signal and the other of the time delay devices has had an output signal and the associated one of the reacceleration detectors has an output signal.

13 Claims, 4 Drawing Figures

ANTI-SKID SYSTEM

BACKGROUND OF THE INVENTION

The invention relates to an anti-skid system for motor vehicles in which, in order to prevent one or more wheels from skidding, the braking pressure in the brake cylinders of the wheels of at least one axle is influenced jointly by a single pressure control unit as a function of the signals of speed sensors detecting the state of motion of the wheels.

Anti-skid control systems of the above mentioned type are known in different embodiments.

U.S. Pat. No. 3,498,683 mainly suggests an arrangement of an inlet and an outlet valve in the pressure medium line between the master cylinder and a wheel brake cylinder, said inlet and outlet valve being actuated by acceleration and deceleration signals of sensors provided at the wheels. When the rotative deceleration of a wheel reaches a certain critical value, which would cause skidding of this wheel if the braking was continued with undiminished force, the inlet valve is closed and the pressure medium connection between master cylinder and wheel cylinder is interrupted. At the same time the outlet valve is opened, thereby connecting the wheel cylinder to a pressureless reservoir so that the pressure medium can be released in the part of the brake line which is connected with the wheel cylinder.

Thus, the wheel reaches reacceleration after having passed a deceleration maximum and the critical rotative deceleration value is again exceeded. At this point only the outlet valve is actuated and closed again while the inlet valve remains closed so that during the following period the pressure medium largely remains constant in the part of the brake line connected with the wheel cylinder. By the inertia inherent to the system the wheel is reaccelerated and approaches the speed of the vehicle after having passed an acceleration maximum. The constant pressure in the brake line is maintained until the wheel has reached a speed favorable for a new braking. At this time the inlet valve is opened at the corresponding acceleration signal of the sensor. Then a new braking and a new control cycle is started.

It would be obvious that a voluminous construction would result by inserting an inlet and an outlet valve in each of the wheels to be controlled as well as providing an adequate electronic control system for their actuation. This would result in each wheel being controlled individually, and pressure would be released in the wheel cylinder of each wheel only as far as is necessary to prevent this one wheel from skidding. In practice this possibility would not be considered due to the costs and space involved, especially since the wheels of one axle normally reach the state of skidding approximately at the same time, therefore, both valve units must be actuated simultaneously. Consequently, a valve and an electronic control system will be provided in the common brake line of the wheels of one axle, that is, to say before the bifurcation. The control system will then be actuated by the sensor signal of the wheel reaching the critical deceleration value first. As long as the friction value between road and wheel contact surface of the wheels is nearly equal, or the difference is so small that it can be neglected, this is the only profitable manner of providing an anti-skid control system.

The case may occur, however, that during a braking there are, for example, friction values of such difference at a left and a right wheel (contaminated road or partly covered with ice) that there are substantial disadvantages for the brake action if the control is effected according to the principle described above. The wheel with the lower friction value reaches the critical deceleration level considerably earlier than the other wheel or wheels. The control action and, thus, the pressure release is initiated by the wheel having the lower friction value. The pressure release does not only apply to the skidding wheel, but also to the wheels which still roll orderly and can be braked impeccably. The braking distance is considerably longer due to the early pressure release in the brake line of these wheels which are not skidding. If, however, the deceleration level is set too high, or if the response of the control system depends on the sensor signals of both wheels acting on its input, there is the possibility of the deceleration level being exceeded and the danger of skidding not being overcome safely.

The same disadvantages also occur in anti-skid systems which control the brake pressure differently, but for at least two wheels in common as a function of deceleration and acceleration levels, or speed levels.

U. S. Pat. No. 3,401,987 describes a device in which a closing valve and a plunger unit operable together with the closing valve are arranged in the pressure medium line of one axle, preferably the rear axle, before its bifurcation to the two wheel cylinders. The plunger is connected with a spring-loaded diaphragm which can be actuated on both sides as a function of the sensors detecting the state of motion, especially the state of deceleration, of the two wheels of this axle so that the plunger is moved accordingly and the brake pressure introduced in the wheel cylinders by the driver can be decreased and increased again.

Only one pressure modulator is provided for both wheels of one axle in the system according to the U. S. Pat. No. 3,331,641. A valve, actuated in accordance with deceleration, controls the pressure supplied by a hydraulic source of energy which acts on a piston in opposite direction, said piston being operated by an attendant or driver. According to the position of the piston the hydraulic source of energy is connected with the wheel cylinders for the actuation of the brakes, or this connection is simply interrupted, thus, maintaining a constant pressure, or there is a connection to the wheel cylinders allowing a pressure release in the whole brake circuit. The deceleration sensor as well as the valve controlled in accordance with deceleration are provided for each wheel. In a certain deceleration range, the brake pressure is continuously throttled as a function of the deceleration of all four wheels due to the effect of force and counterforce at the pistons controlling the brake pressure. As soon as a wheel approaches the critical deceleration value, the brake pressure in the whole brake circuit is influenced by acting on the piston opposite to the pedal force.

All of these known anti-skid control systems, which modulate the brake pressure in the wheel cylinders of the wheels of at least one axle, have the above mentioned disadvantage for the case in which the difference of the friction values between road and wheel contact surface of the individual wheels cannot be neglected during a braking.

SUMMARY OF THE INVENTION

An object of the present invention is to provide a new electronic control system to initiate the control action of a single braking pressure control valve for the wheel brakes of at least one axle. This electronic control system can be employed with many different anti-skid braking pressure control devices to overcome the above-mentioned disadvantage, but yet will not excessively increase the costs for the anti-skid system or the space required to house the same.

A feature of the present invention is the provision of an anti-skid system for a motor vehicle comprising a single brake pressure control means to control the braking of both wheels of at least one axle of the vehicle; and an electronic control system to produce at least a first actuation signal for the control means to release braking pressure at both of the wheels to prevent skidding of at least one of the wheels; the control system including a pair of speed sensors, a different one of the sensors being coupled to each wheel of the one axle, and first means coupled to both of the sensors and the control means to produce the first actuation signal as a function of speed signals and incipient skid deceleration signals generated in response to a speed signal from both of the sensors.

Another feature of the present invention is the provision of the above-mentioned control system further including second means coupled to both of the sensors and the control means to produce a second actuation signal for said control means as a function of reacceleration signals generated in response to a speed signal from both of the sensors, the second actuation signal causing the control means to reapply braking pressure to both of the wheels.

The control system produces the first actuation signal when both wheels of at least one axle have reached a predetermined incipient skid rotative deceleration level $-b_s$ and from this moment on a decrease of the rotative speed $\Delta v$ at both wheels.

Furthermore, the control system produces the first actuation signal when one of the wheels has reached a predetermined incipient skid rotative deceleration level $-b_s$ and also a decrease $\Delta v$ of the rotative speed thereof and a rotative speed difference A has been detected between the two wheels of the one axle.

The control system produces the second actuation signal when both wheels of at least one axle have reached their respective reacceleration maximum $+b_{max}$, or when the deceleration of one wheel of an axle previously reached the deceleration level $-b_s$ and now has reached its reacceleration maximum $+b_{max}$ but the second wheel has not reached the deceleration level $-bs$.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figure 1:
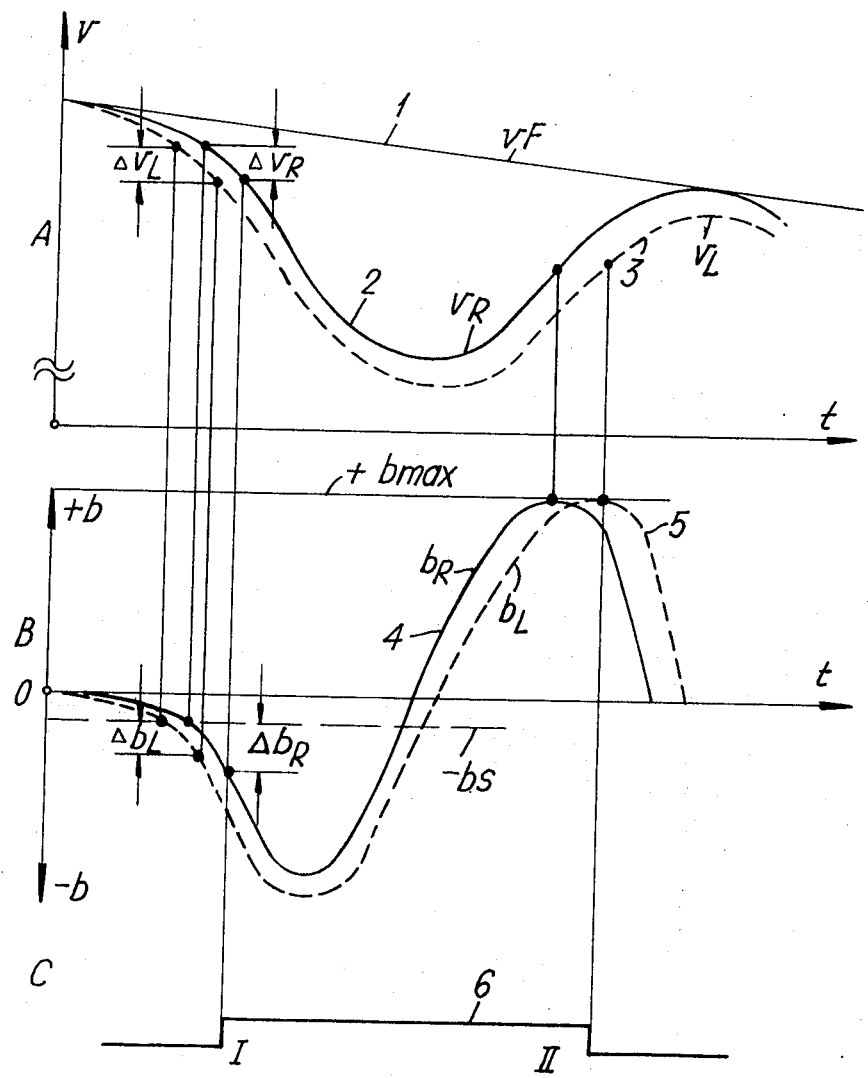
FIG. 1 illustrates the speed and deceleration curves of two wheels of one axle of a vehicle during a control cycle with approximately equal friction value at both wheels and also the switching action of the control valve.

Diagram A of FIG. 1 illustrates the curve 1 of the vehicle speed $v_F$ during a brake action versus time $t$. solid line curve 2 illustrates the corresponding curve of the rotative speed $v_R$ of a right wheel of one axle of a vehicle and dotted curve 3 illustrates the curve of the rotative speed $v_L$ of a left wheel of the one axle of this vehicle versus time $t$. FIG. 1 illustrates the case where during a brake action the resulting skid control the wheels of the left and right side of the vehicle have largely the same friction value conditions, and, consequently, the rotative speeds of the left and right wheels have no or only a slight difference.

Diagram B of FIG. 1 illustrates the acceleration (deceleration) curve b of the same wheels as graph A over the time t, said curves occurring during the brake action. The solid line curve 4 applying to the right wheel and the dotted line curve 5 applying to the left wheel. Curve 6 in diagram C of FIG. 1 represents the switching action of the control valve disposed between master cylinder and wheel cylinder of a vehicle axle, said switching in the present case being effected as a function of the speed and acceleration conditions at the wheels on both sides of the vehicle. At I the control valve for the pressure release in the part of the brake line connected with the wheel cylinders of an axle is closed and at II this control valve is reopened for new pressure build-up in the same part of the brake line. The switching action of the control valve is not effected as in the systems according to the prior art, that is to say, only as a function of deceleration and acceleration levels. The electronic control system of the present invention produces a first actuation signal for closing the control valve at I when the rotative deceleration of both wheels of the controlled axle having reached a certain deceleration level $-b_s$ and the rotative speed of both wheel have been reduced by a fixed amount $\Delta v_R$ while the rotative deceleration still increases by the amount $\Delta b$. The diagrams of FIG. 1 illustrate these difference amounts marked $\Delta v_L$ and $\Delta b_L$ for the left wheel and $\Delta v_R$ and $\Delta b_R$ for the right wheel. The difference of the rotative speeds $\Delta v_L$ and $\Delta v_R$ is equal as to its absolute value while the differences $\Delta b_L$ and $\Delta b_R$ of the rotative deceleration can have a negligible difference. After the separation of the wheel cylinders from the master cylinder by the closing of the control valve as described above the brake pressure is released either by pressure medium extraction or by volume increase in the part of the brake line connected with the wheel cylinders so that the wheels reaccelerate after a certain deceleration time due to inertia and their rotative speed again approaches the vehicle speed. Both wheels having reached a certain acceleration level, preferably their reacceleration maximum $+b_{max}$, the electronic system produces a second actuation signal, said second actuation signal reopening the closing valve at II in curve 6 of FIG. 1. This enables building up new brake pressure in the wheel cylinders and enables the start of a new control cycle.

By this kind of response of the control system to a combined signal, which takes into cosideration the state of motion of both vehicle wheels of an axle, a too early initiation of the control at a lower deceleration level for the vehicle and an excessive increase of the braking distance is prevented on the one hand. On the other hand the exceeding of the critical deceleration level and the skidding of the vehicle are also prevented as long as the friction value conditions at both wheels only differ by a certain maximum.

Figure 2:
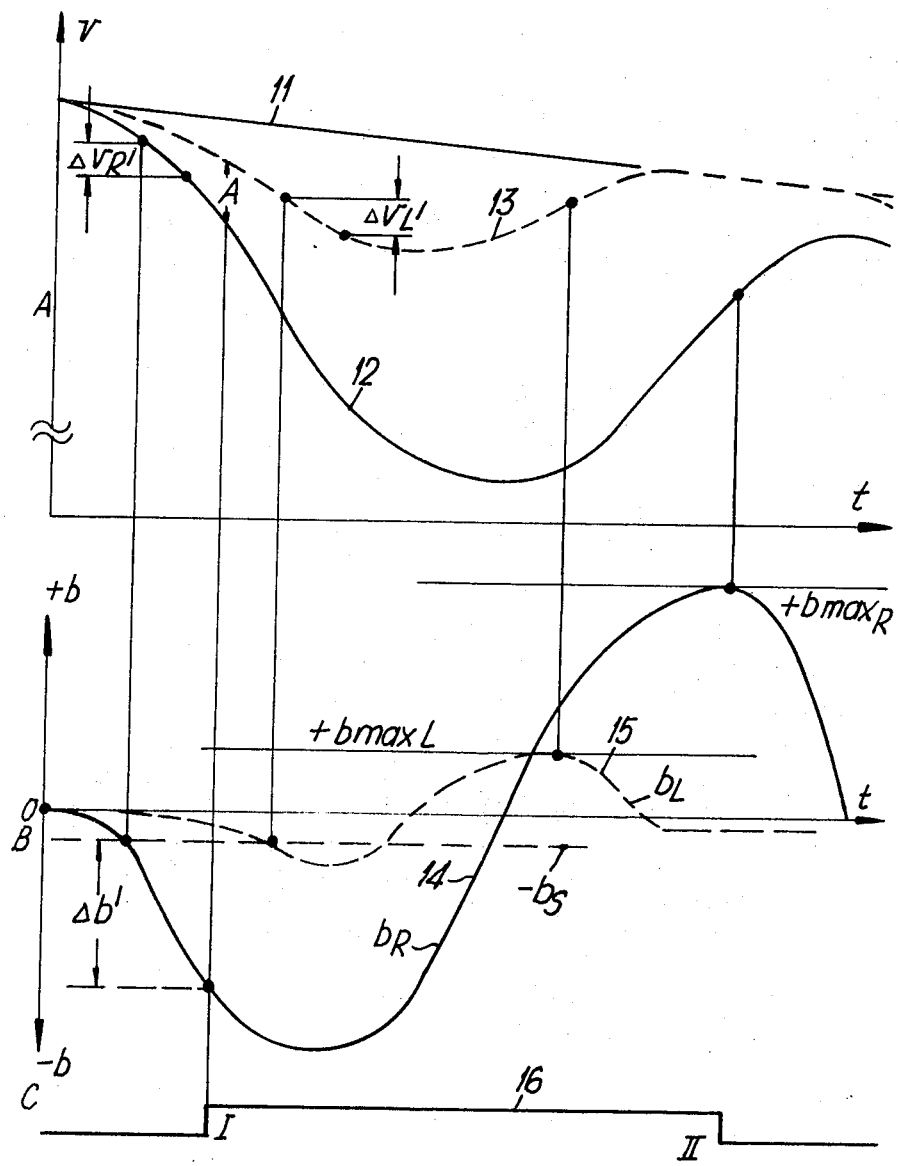
FIG. 2 illustrates the speed and deceleration curves of two wheels of one axle of a vehicle with a difference of the friction value at each wheel, which cannot be neglected, during a control cycle and also the corresponding switching action of the controlling valve.

FIG. 2 shows the corresponding curves in the diagram A, B and C for the case where friction value differences occur at the right and the left wheel of a vehicle axle during a braking which cannot be neglected. Curve 11 in diagram A of FIG. 2 illustrates the speed curve versus time of the vehicle. Curves 12 and 13 represent the simultaneously occurring rotative speeds of the right and left wheels of the vehicle axle. In the represented example it is assumed that the right vehicle wheel (solid line curve 12) finds a substantially smaller friction value than the left vehicle wheel (dotted line curve 13). Accordingly the rotative speed at the right wheel decreases considerably faster after application of the brakes and the right wheel tends to skid earlier than the left wheel of the same vehicle axle. Diagram B of FIG. 2 illustrates the resulting strong deceleration at the right wheel (solid line curve 14) and the substantially smaller deceleration at the left wheel (dotted line curve 15).

If in this case with the different friction value conditions at the right and the left wheel of a vehicle axle the control was initiated according to the same criteria as described above with respect to FIG. 1, namely, beginning the decrease of the brake pressure only as soon as both vehicle wheels have reached a certain deceleration level $-b_s$ and a predetermined speed difference $\Delta v$, then the right wheel would have locked in the represented example long before the left wheel would have reached the deceleration level $-b_s$. The switching of the control valve, preferably in the form of a 3/2-way valve, shown in curve 16 of diagram C between master cylinder and the wheel cylinders as well as the accompanying decrease and new increase of the brake pressure in the part of the brake circuit constantly connected with the wheel cylinders must be effected as a function of another signal combination.

A second electronic working cycle in the electronic control system produced a first actuation signal closing the control valve at I in the curve 16 as soon as one of the two wheels (in the represented example the right one) reaches the acceleration level $-b_s$ and from this moment on shows a speed difference of $\Delta v_R$ and as soon as there is a difference A between the rotative speeds of the two wheels. At this point the closing valve is actuated (point I in the curve 6), i.e. closed, so that the wheel cylinders of this axle are separated from the master cylinder, and the brake pressure in the part of the brake circuit connected with the wheel cylinders is released by pressure medium extraction or volume increase. The inertia inherent to the system causes a further deceleration at both wheels for the time being. The left wheel, too, then reaches the deceleration level $-b_s$, a fact which does not, however, influence the control. Both wheels pass a deceleration maximum and then are reaccelerated so that their rotative speeds approach the value of the present vehicle speed. The previously less decelerated wheel ( in our example the left one, dotted curve 13 and 15) actually reaches this value and possibly rotates at vehicle speed for a limited time, completely without slip, until the control valve is reopened at point II in the curve 16 by a new signal produced in the control unit. This signal is produced as soon as the left as well as the right wheel have reached their reacceleration maximum $+b_{max}$ and $+b_{maxL}$, in this case at two different spaced times. After the opening of the control valve pressure can be built up again from the master cylinder and a new brake control cycle begins. Thus, on one hand there is prevented, with unfavorable friction conditions for a vehicle wheel, that the brake pressure in the whole brake circuit, or in the brake circuit of one axle is drecreased unnecessarily early and the braking distance prolonged and, on the other hand, there is also prevented the skidding of a wheel before the control system responds.

Figure 3:
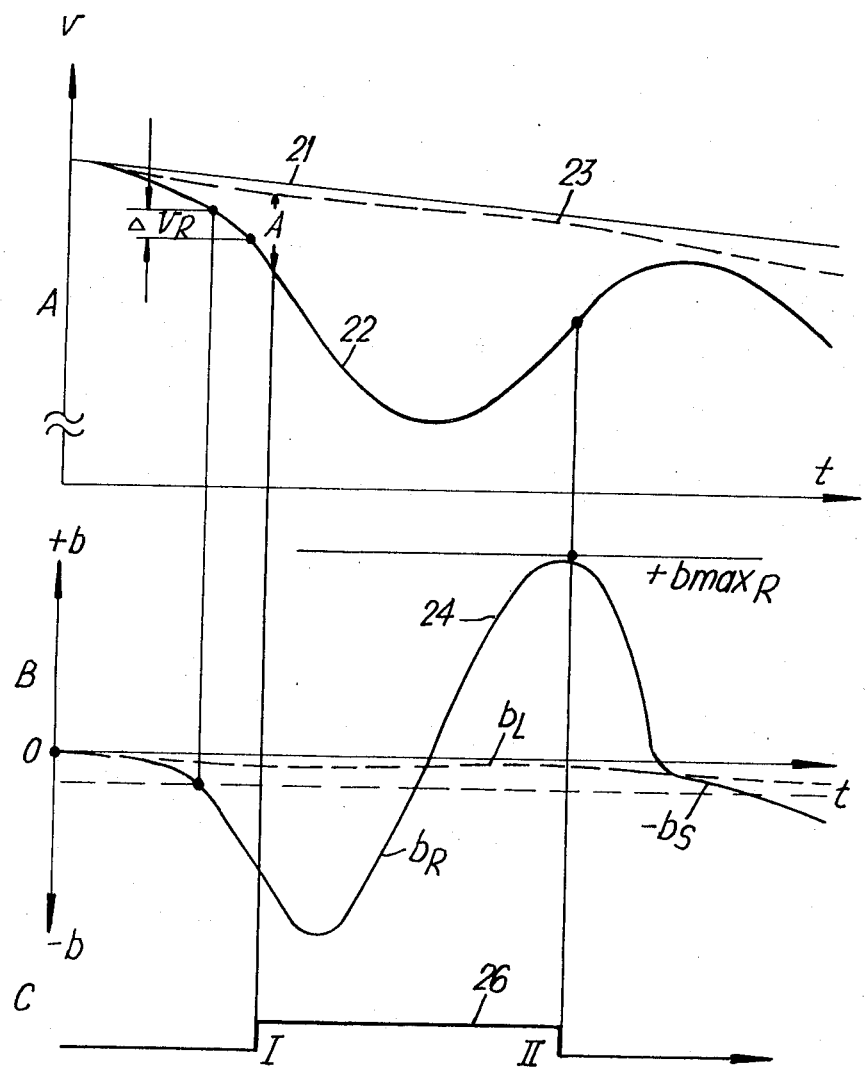
FIG. 3 illustrates the speed and deceleration curves of two wheels of a vehicle with a great difference in the friction value at each wheel during a control cycle and also the corresponding switching action of the controlling valve.

FIG. 3 shows the speed and deceleration diagram as well as the switching of the control valve for an extreme case of friction value differences at the right and the left wheel of a vehicle axle.

In our example, the right wheel again has an extremely low friction value between road and wheel contact surface, and the rotative speed of this wheel decreases rapidly after braking is started (solid line curve 22 in diagram A). The left wheel, however, can continue to roll and its rotative speeds drops only slightly in the same period of time (dotted line curve 23 in diagram A) and remains near the vehicle speed (curve 21). The deceleration curve 24 (solid line curve) of the right wheel in diagram B is correspondingly steep while the deceleration curve 25 (dotted line curve) of the left wheel is flat and does not reach the deceleration level value $-b_s$. According to the invention the control valve is closed at point I — as represented in the curve 26 of diagram C — by a signal produced by the control system when a rotative speed has a change of at least $\Delta v_R$ and a rotative speed difference A between the left and the right wheel which is determined after the right wheel has exceeded the deceleration level $-b_s$. The right wheel can now reaccelerate following the pressure decrease in the part of the brake circuit connected with the wheel cylinders. As the left wheel was hardly decelerated there is no distinct reacceleration maximum in its deceleration curve 25. The electronic control system of this invention produces a signal for the opening of the control valve (point II in curve 26) — no speed decrease $\Delta v$ having been registered before at the left wheel — as soon as the wheel which previously showed great deceleration, in our example the right one, reaches its reacceleration maximum $+b_{max.R}$. Then a new braking and a new control cycle can begin.

Figure 4:
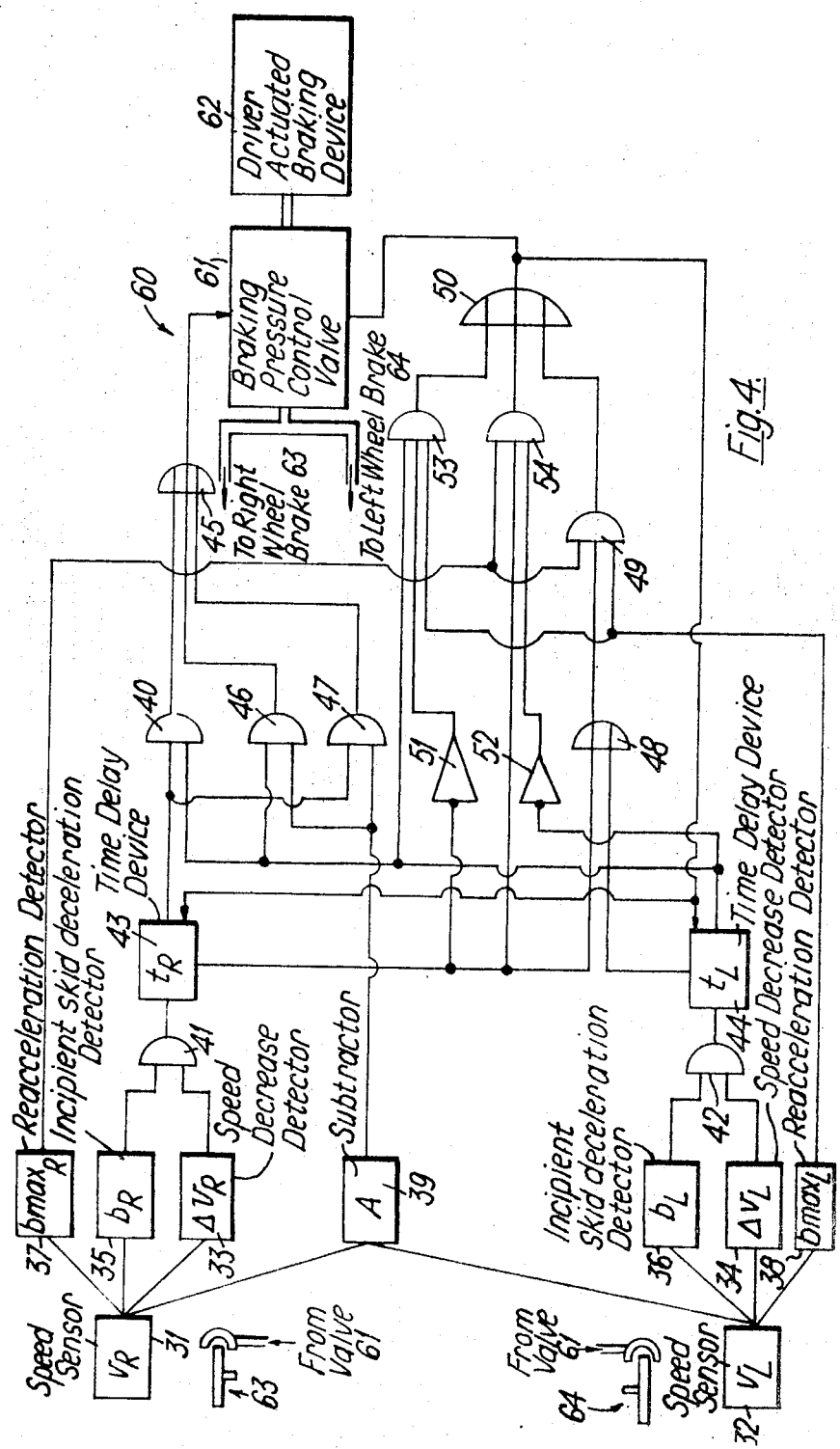
FIG. 4 illustrates in schematic block diagram form one embodiment of the electronic control system for an anti-skid system in accordance with the principles of the present invention.

Referring to FIG. 4, there is illustrated therein in schematic block diagram form one embodiment of the electronic control system 60 incorporated in an anti-skid system including therein a braking pressure control valve 61 actuated by first and second actuation signals produced by control system 60. It is to be understood that control system 60 and valve 61, which may be a solenoid actuated 3/2 — way valve is only presented as an example of one form of an anti-skid system that enables achievement of the objects and features of the present invention. Other types of electronic control systems and control valves may be provided to achieve the object and features of the present invention.

Prior to the actuation of control system 60, control valve 61 passes hydraulic fluid from driver actuated braking device 62 which may be in the form of a known master cylinder or a combination of a master cylinder and power brake (brake booster) actuated by a foot pedal. The hydraulic fluid passes from valve 61 to the right wheel brake 63 of an axle of a motor vehicle and to the left wheel brake 64 of the same axle.

The electronic control system will now be described. Speed sensor 31 is associated with the right wheel of one of the vehicle axles to determine the rotary speed thereof and may take any number of different forms known in the art. A similar speed sensor 32 is associated with the left wheel of the same axle of the vehicle. The output of sensors 31 and 32 are coupled to speed decrease detectors 33 and 34, respectively. Detectors 33 and 34 may be a threshold type circuit that produces an output signal when the threshold bias is exceeded wherein the threshold bias will determine the change of speed $\Delta v$ that is to be detected. Incipient skid deceleration detectors 35 and 36 are coupled to speed sensors 31 and 32, respectively. Detectors 35 and 36 may include, for instance, an integrator coupled to the speed sensor, a differentiator coupled to the output of the integrator and a threshold device coupled to the output of the differentiator. The threshold level of the threshold device of detectors 35 and 36 would be set to correspond to the $-bs$ deceleration level illustrated in diagrams B of FIGS. 1–3 so that an output indicating an incipient skid is produced when the deceleration signal exceeds the threshold level of the threshold device. Reacceleration detectors 37 and 38 are coupled to sensors 31 and 32, respectively. Detectors 37 and 38 may include, for instance, an integrator coupled to the sensor, a differentiator coupled to the output of the integrator and a threshold device coupled to the output of the differentiator with the threshold level of the threshold device being set at a value equal to $b_{max}$ for the particular wheel being considered. Detectors 37 and 38 will produce an output when the threshold level set therein is equaled or exceeded. Further a subtractor 39 is coupled to the output of each of the sensors 31 and 32. Subtractor 39 provides an output signal when there is a significant difference in the rotary speed of the two wheels as sensed by sensors 31 and 32.

In order to obtain a first actuation signal for pressure release in the brake circuit in the normal case illustrated in FIG. 1, that is, when both wheels approach the incipient skid level $-bs$ approximately at the same time, output signals of detectors 33 and 35 are coupled to AND gate 41 and the output signals from detectors 34 and 36 are coupled to AND gate 42. When there is input signal from the two detectors coupled to AND gates 41 and 42 there will be provided an output signal coupled to storage or time delay devices 43 and 44, respectively. The output signal from devices 43 and 44 are coupled to an AND gate 40 which provides the first actuation signal for valve 61 through OR gate 45. Storage or time delay devices 43 and 44 may take many different forms so as to store or time delay the presence of an output signal from their associated one of gates 41 and 42. One such form could include a bistable device for each of the devices 43 and 44 which is set to provide a high or binary 1 output when an input signal is received from its associated one of gates 41 and 42. Prior to starting another control cycle the bistable devices of devices 43 and 44 would be reset to its low or binary 0 output by the second actuation signal whose production will be described hereinbelow.

In accordance with the condition illustrated in FIG. 2, wherein high friction value differences are present at the two wheels, the speed decrease of one of the wheels is very small, or according to FIG. 3 the deceleration valve $-bs$ has not been reached, one of the AND gates 41 or 42 does not emit a signal. In order to provide a first actuation signal to prevent skidding of the wheel that is in a condition to skid two AND gates 46 and 47 are provided. One input to AND gate 46 is coupled to time delay device 44 and the other input thereof is connected to the output of subtractor 39. One input of AND gate 47 is coupled to the output of time delay device 43 and the other input thereof is connected to the output of subtractor 39. As soon as a wheel reaches the deceleration level $-bs$ and a certain speed decrease is detected at one of the wheels, in other words, one of the wheels tends to skid, and there is a certain speed difference beteen the two wheels one of the AND gates 46 and 47 produces an output signal which again passes through OR gate 45 as the first actuation signal to actuated valve 61 for pressure release in the brake circuit.

As described hereinabove with respect to FIGS. 1 and 2, the second actuation signal to enable a new pressure buildup in the wheel cylinders, where both wheels have previously exceeded the deceleration level $-bs$ during the braking is produced when both wheels have reached their associated reacceleration maximum level after the pressure release. For the purpose of generating the second actuating signal under these conditions the output signals of time delay devices 43 and 44 are coupled to an OR gate 48. The output signal of OR gate 48 together with the output signals of detectoRs 37 and 38 are coupled to an AND gate 49. An output signal from AND gate 49 when both detectors 37 and 38 produce an output signal and there is an output signal from either of devices 43 and 44 becomes the second actuation signal for valve 61 at the output of OR gate 50 which enables a new pressure buildup in the brake system connected to the two wheels. Simultaneously this second actuation signal will reset time delay devices 43 and 44 to enable the start of the next control cycle.

In the situation illustrated in FIG. 3 one of the wheels does not reach the deceleration level $-bs$ during braking, but the first actuation signal was produced only because of the other wheel tended to skid. A new pressure buildup which is permitted by the generation of the second actuating signal is produced as a function of the reacceleration maximum of the wheel that has reached or exceeded the deceleration level $-bs$ during the braking process and then has reached its reacceleration maximum value. To accomplish the production of the second actuation signal in the situation illustrated in FIG. 3 the output signals of the two time delay devices 43 and 44 are coupled to NOT gates 51 and 52, respectively. The output signal of NOt gate 51, which is associated with the right wheel, is coupled to AND gate 53, which is associated with the left wheel. The other input signals to AND gate 53 are provided by the output signal of time delay device 44 and detector 38. When these three input signals to AND gate 53 are high an output signal is produced which becomes the second actuation signal for valve 61 at the utput of OR gate 50. Simultaneously, this second actuation signal resets devices 43 and 44. The output signal of NOT gate 52, which is associated with the left wheel, is coupled to AND gate 54, which is associated with the right wheel, the other input signals for AND gate 54 are the output signals of the delay device 43 and detector 37. When these three input signals to AND gate 54 are high an output signal is produced which becomes the second actuation signal for valve 61 at the output of OR gate 50. Simultaneously, this second actuation signal resets devices 43 and 44. The second actuation signal is produced by the output signal of AND gates 53 or 54 depending upon which of the wheels exceeds the deceleration level -bs and then achieves its maximum reacceleration level.

In accordance with the principles of the present invention the response of the electronic control circuit is in accordance with an average of the control values of both wheels, when only one braking pressure control valve is arranged in the common brake circuit, so that a shortened braking distance is achieved without the danger that the incipient skid deceleration level is exceeded and undesired skidding with take place.

While we have described above the principles of our invention in connection with specific apparatus it is to be more clearly understood that this description is made only by way of example and not as a limitation to the scope of our invention as set forth in the objects thereof and in the accompanying claims.

We claim:

1. An anti-skid system for a motor vehicle comprising:
    a single brake pressure control means to control the braking of both wheels of at least one axle of said vehicle; and
    an electronic control system to produce at least a first actuation signal for said control means to release brake pressure at both of said wheels to prevent the skidding of at least one of said wheels;
said control system including
    a pair of speed sensors, a different one of said sensors being coupled to each wheel of said one axle,
    a subtractor coupled to each of said sensors to produce a first signal proportional to the difference in speed signals generated by both of said sensors,
    a first incipient skid deceleration detector coupled to one of said sensors to produce a second signal proportional to an incipient skid deceleration signal of one of said wheels,
    a second incipient skid deceleration detector coupled to the other of said sensors to produce a third signal proportional to an incipient skid deceleration signal of the other of said wheels,
    a first speed decrease detector coupled to one of said sensors to produce a fourth signal proportional to a given decrease in one of said speed signals after said second signal is produced,
    a second speed decrease detector coupled to the other of said sensors to produce a fifth signal proportional to a given decrease in the other of said speed signals after said third signal is produced, and
    first logic circuitry coupled to said subtractor, said first and second deceleration detectors and said first and second decrease detectors to produce said first actuation signal in response to a combination of signals selected from said first, second, third, fourth and fifth signals.

2. A system according to claim 1, wherein
    said first logic circuitry is responsive to the combination of said second, third, fourth and fifth signals to produce said first actuation signal.

3. A system according to claim 1, wherein
    said first logic circuitry is responsive to the combination of said first signal, one of said second and third signals and one of said third and fourth signals to produce said first actuation signal.

4. A system according to claim 1, wherein said first logic circuitry includes
    a first AND gate coupled to said first deceleration detector and said first speed decrease detector,
    a second AND gate coupled to said second deceleration detector and said second speed decrease detector,
    a first time delay device coupled to said first AND gate,
    a second time delay device coupled to said second AND gate,
    a third AND gate coupled to said first and second time delay devices,
    a fourth AND gate coupled to said second time delay device and said subtractor,
    a fifth AND gate coupled to said first time delay device and said subtractor, and
    a first OR gate coupled to said third, fourth and fifth AND gates to produce said first actuation signal.

5. A system according to claim 4, wherein said control system further includes
    means coupled to both of said sensors and said control means to produce a second actuation signal to cause said control means to reapply braking pressure to both of said wheels.

6. A system according to claim 5, wherein
    said second actuation signal is produced when both of said wheels have achieved a given reacceleration value.

7. A system according to claim 5, wherein
    said second actuation signal is produced when the speed of one of said wheels does not result in producing one of said second and third signals and the other of said wheels has achieved a given reacceleration value after producing the other of said second and third signals.

8. A system according to claim 5, wherein said means includes
    a first reacceleration detector coupled to one of said sensors to produce a sixth signal when the associated one of said wheels has achieved a first given reacceleration value,
    a second reacceleration detector coupled to the other of said sensors to produce a seventh signal when the associated one of said wheels has achieved a second given reacceleration value, and second logic circuitry coupled to said first and second reacceleration detectors and said first and second time delay devices to produce said second actuation signal.

9. A system according to claim 8, wherein said logic circuitry includes
    a second OR gate coupled to said first and second time delay devices,
    a first NOT gate coupld to said first time delay device,
    a second NOT gate coupled to said second time delay device, a sixth AND gate coupled to said second time delay device, said first NOT gate and said second reacceleration detector, a seventh AND gate coupled to said first time delay device, said second NOT gate and said first reacceleration detector, an eighth AND gate coupled to said second OR gate and said first and second reacceleration detectors, and a third OR gate coupled to said sixth, seventh and eighth AND gates to produce said second actuation signal.

10. A system according to claim 9, wherein
the output of said third OR gate is coupled to said first and second time delay device, said first and second time delay device being reset to their initial output condition in response to said second actuation signal.

11. A system according to claim 1, wherein said control system further includes
means coupled to both of said sensors and said control means to produce a second actuation signal for said control means as a function of reacceleration signals generated in response to a speed signal from both of said sensors, said second actuation signal causing said control means to reapply braking pressure to both of said wheels.

12. A system according to claim 11, wherein
said second actuation signal is produced when both of said wheels have achieved a given reacceleration value.

13. A system according to claim 11, wherein
said second actuation signal is produced when one of said wheels has not achieved an incipient skid deceleration and the other of said wheels has achieved a given reacceleration value after having achieved an incipient skid deceleration.

* * * * *